United States Patent [19]
Riza et al.

[11] Patent Number: 5,477,350
[45] Date of Patent: Dec. 19, 1995

[54] INTERFEROMETRIC SPATIAL SWITCH FOR POLARIZED OR UNPOLARIZED LIGHT USING LIQUID CRYSTAL

[75] Inventors: Nabeel A. Riza, Clifton Park; Donald E. Castleberry, Schenectady, both of N.Y.; Thomas L. Credelle, Los Gatos, Calif.; Michael C. DeJule, Clifton Park, N.Y.

[73] Assignee: General Electric Company, Schenectady, N.Y.

[21] Appl. No.: 69,474

[22] Filed: Jun. 1, 1993

[51] Int. Cl.[6] .............................. G02F 1/13; G02F 1/1335
[52] U.S. Cl. .................................. 359/39; 359/93; 359/94; 359/250; 359/259; 359/303; 359/279; 356/5.01; 385/16
[58] Field of Search ................................. 359/39, 93, 94, 359/95, 42, 245, 259, 279, 107, 303, 583, 589, 577, 578, 40; 356/357, 365, 368, 360, 349; 385/3, 9, 16

[56] References Cited

U.S. PATENT DOCUMENTS

| | | | |
|---|---|---|---|
| 4,183,670 | 1/1980 | Russel | 356/350 |
| 4,291,939 | 9/1981 | Giallorenzi et al. | 385/16 |
| 4,773,732 | 9/1988 | Schäfer | 359/578 |
| 4,854,677 | 8/1989 | O'Meara | 359/245 |
| 4,878,723 | 11/1989 | Chen et al. | |
| 4,979,235 | 12/1990 | Rumbaugh et al. | 455/616 |
| 5,044,712 | 9/1991 | Soref | |
| 5,056,885 | 10/1991 | Chinn | 385/16 |
| 5,117,239 | 5/1992 | Riza | 342/375 |
| 5,388,169 | 2/1995 | Kobayashi et al. | 359/42 |

FOREIGN PATENT DOCUMENTS

| | | | |
|---|---|---|---|
| 0959014 | 9/1982 | U.S.S.R. | 385/3 |

OTHER PUBLICATIONS

Aviation Week and Space Technology, "New Module Splits Laser Beams", Oct. 1963.
GE Technical Information Series Report entitled "Interferometric Techniques for Characterizing Nematic Liquid–Crystal Optical Phase Modulators", N. A. Riza, Apr. 1991, pp. 1–21.
"Electrically Controlled Optical Switch for Multimode Fiber Applications," Wagner and Cheng, Applied Optics, vol. 19, No. 17, Sep. 1980, pp. 2921–2925.
"Nematic Liquid Crystal Modulator with Response Time Less than 100 μs at Room Temperature", S. T. Wu, Applied Physics Letters, vol. 57, No. 10, Sep. 1990, pp. 986–988.
"Small Angle Relaxation of Highly Deformed Neumatic Liquid Crystal", S. T. Wu and C. S. Wu, Applied Physics Letters, vol. 53, No. 19, Nov. 1988, pp. 1794–1796.

Primary Examiner—William L. Sikes
Assistant Examiner—Kenneth Parker
Attorney, Agent, or Firm—Enrique J. Mora; Marvin Snyder

[57] ABSTRACT

An interferometric switch for spatially switching either linearly polarized or unpolarized externally derived beams of substantially coherent light includes an optical input unit for dividing an externally derived light beam into a constituent beam pair. An optical phase modulating device includes a nematic liquid crystal pixel for selectively shifting the relative phase of the constituent beam pair. An output unit cooperates to combine respective components of the constituent beam pair along coincident collinear paths so as to form a respective output light beam directed along a selected one of first and second output axes, according to the relative phase imparted by the phase-modulating device. The phase modulating device may comprise a cascading arrangement of pixel stages which can respectively provide a selected incremental phase-shift to each constituent beam passing therethrough.

32 Claims, 4 Drawing Sheets

INTERFEROMETRIC SPATIAL SWITCH FOR POLARIZED OR UNPOLARIZED LIGHT USING LIQUID CRYSTAL

BACKGROUND OF THE INVENTION

This invention relates to optical switches and, more particularly, to an electrically controlled interferometric spatial switch.

An essential component in most optical processing systems is an efficient light switch. Key characteristics of a light switch used in an optical processing system, in which the processed light must commonly pass through many switches, are the amount of optical loss or attenuation that the light beam experiences in passing through the switch and the on–off response time of the switch. A commonly used light switch is a lithium niobate, integrated-optics switch that provides relatively fast on–off response time but typically also has about 3 dB light loss per switch. Thus, for example, if a light beam is passed through only seven such switches in an optical system, it will be attenuated by 21 dB, i.e., the light intensity of the output beam drops to $1/128$th of the intensity of the input beam.

One efficient, low loss light switch may typically include a polarizing beam splitter (PBS) and a liquid crystal pixel array to selectively control the polarization of light beams entering the PBS. One example of optical switching using a PBS and a liquid crystal array is disclosed in U.S. Pat. No. 5,117,239 of N. Riza, issued 26 May 1992 and which is assigned to the assignee of the present invention and incorporated herein by reference. As efficient as this switch is, its use is limited to polarized light. Further, the operation of this switch is not based on the principle of optical interference.

Polarization-independent types of beam splitter switches have been suggested that enable an unpolarized light beam to be selectively directed along a selected path. One example of such a polarization-independent switch is described by Wagner and Cheng in "Electrically Controlled Optical Switch for Multimode Fiber Applications," Applied Optics, Vol. 19, No. 17, September 1980, pp 2921–2925. In optical systems, use of polarization-independent switches can be advantageous as there is no reduction of light beam intensity (as may occur if a polarizer is used to polarize light to be used in a polarization-dependent system) and connections between blocks of the optical system can be made with optical fibers that do not require polarization-maintaining fibers. Although the switch suggested by Wagner et al is polarization-independent, it requires high quality polarization-based optical components, such as PBSs, which add at least twice to reduction of light beam intensity as well as to the complexity and cost of the switch, being that high quality polarization-based optical components are, in general, more elaborate than non-polarization based optical components. Here again, Wagner et al do not suggest either an interferometric switch, i.e., a switch based on the principle of optical interference between substantially coherent light beams, or the use of non-polarization based optical components.

A high-speed nematic liquid crystal modulator using the so called high voltage transient nematic effect is described by S. T. Wu in "Nematic Liquid Crystal Modulator with Response Time Less than 100 µs at Room Temperature", Applied Physics Letters, Vol. 57, No. 10, September 1990, pp 2921–2925. However, Wu does not suggest how to use the high voltage transient nematic effect to make an interferometric optical switch based on a high-speed nematic liquid crystal cell. Additionally, Wu suggests neither an interferometric optical switch based on a polarization-independent nematic liquid crystal cell nor a cascading arrangement of nematic liquid crystal cells to further reduce the on–off response time of the interferometric optical switch. A need thus exists for a compact low-loss light switch which can operate either on polarized or unpolarized light using non-polarizing optical components. Further, it is desirable to provide a light switch whose on–off response time is comparable or superior to that of currently available fast-response switches (e.g., 100 µsec).

Accordingly, one object of the invention is to provide an interferometric light switch than can operate either on polarized or unpolarized light.

Another object of the invention is to provide an interferometric switch having a relatively fast on–off response time.

It is yet another object of the invention to provide a compact, low-loss interferometric light switch which uses non-polarizing optical components.

SUMMARY OF THE INVENTION

In accordance with this invention an interferometric spatial switch is provided for selectively directing at least one externally derived beam of substantially coherent light. The switch comprises means, such as, for example, an input collimating lens or an input unit, for dividing the externally derived light beam into a substantially identical constituent beam pair. An optical phase modulating device is optically coupled to the beam-dividing means to receive the constituent beam pair. The phase modulating device includes at least one electrically controllable pixel for selectively shifting the phase differential between the constituent beam pair. An output unit is optically coupled to receive the constituent beam pair passing from the phase-modulating device. The output unit includes a cube beam splitter, for example, and a prism which cooperate to combine respective components of the received constituent beam pair along coincident collinear paths. The collinear paths are situated such that the combined components of the constituent beam pair mutually interfere to form a respective output light beam directed along at least a selected one of first and second output axes in accordance with the phase differential imparted by the phase modulating device. In one aspect of the invention, the output unit is operatively capable of spatially multiplexing the output beam along both the first and the second output axes in accordance with the phase differential between the received constituent beam pair.

In one embodiment of the invention, the phase-modulating device may comprise one pixel stage made up of an associated pixel pair which cooperates in response to predetermined control signals respectively applied thereto to respectively contribute a selected phase shift to each respective constituent beam passing therethrough. At least another pixel stage can be positioned in parallel relationship with the one pixel stage along a common axis so as to form cascading pixel stages having mutually corresponding associated pixel pairs. Each associated pixel pair in the respective cascading pixel stages cooperates in response to predetermined control signals respectively applied to each associated pixel pair to respectively contribute a selected incremental phase shift to each respective constituent beam passing through the cascading pixel stages. The pixels in each of the cascading pixel stages comprise, for example, a nematic liquid crystal cell whose reference optical axis, also commonly referred to as the nematic molecular director, can be predeterminedly aligned to impart a selected phase shift either to polarized light or to the respective mutually orthogonal polarization components of unpolarized light.

In another aspect of this invention, the phase modulating device may comprise a spatial light modulator (SLM) having an array of individually controllable pixels patterned to receive respective ones of a plurality of constituent beam pairs corresponding to additional externally derived light beams received by the beam-dividing means. In this case, predetermined LC (liquid crystal) pixels of the pixel array can individually provide a selected phase differential between respective ones of the plurality of constituent beam pairs; thereby, the interferometric switch can individually and simultaneously direct each of the additional externally derived light beams along at least a selected one of the output axes. The output unit may be optically coupled to associated photodiode arrays for converting received output light beams into corresponding electrical signals. Input and output arrays of collimating lenses may be respectively used for focusing the externally derived light beams passing into the interferometric switch and the light beams emerging therefrom.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following detailed description in conjunction with the accompanying drawings in which like numerals represent like parts throughout the drawings, and in which:

DETAILED DESCRIPTION OF THE INVENTION

Figure 1:
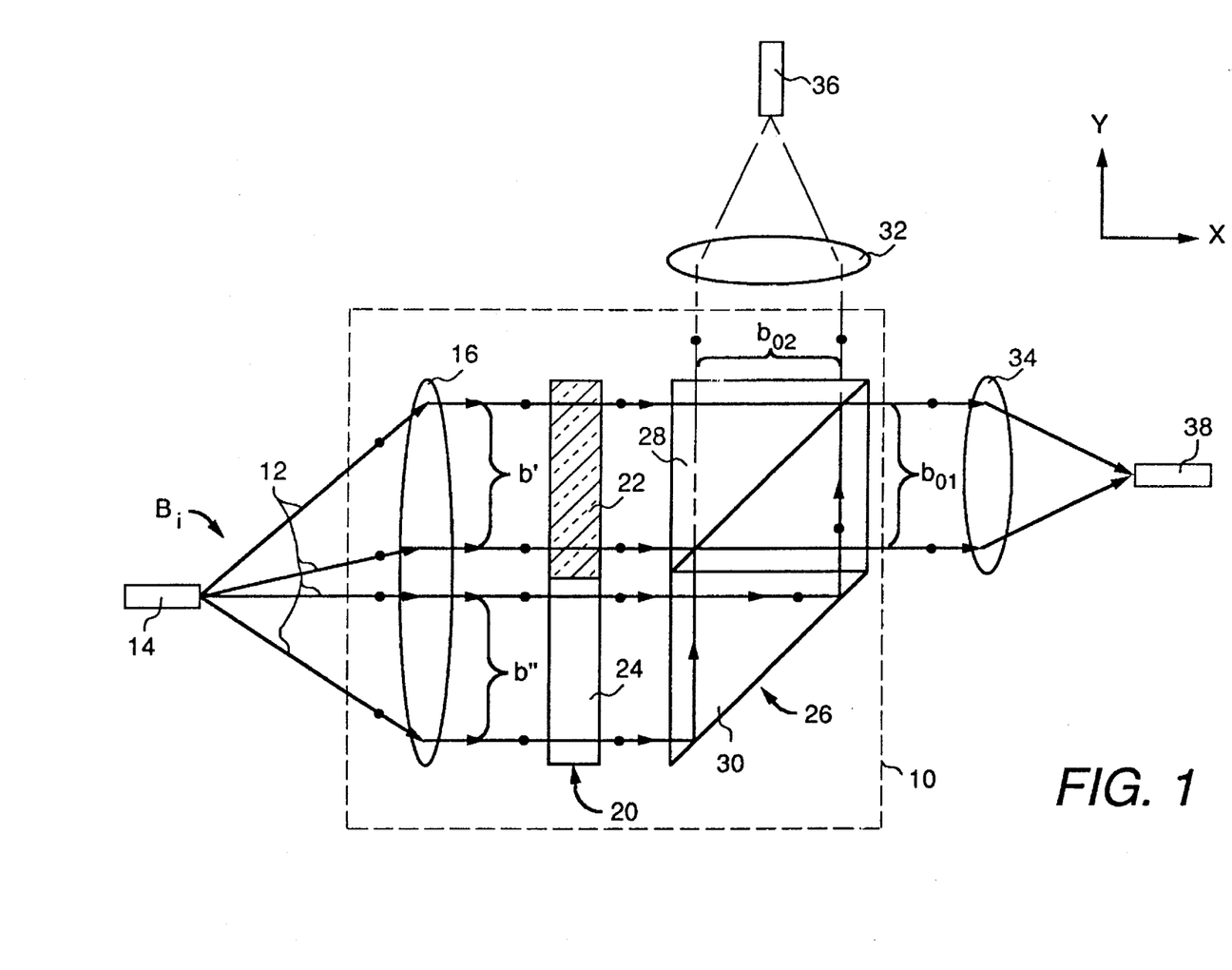
FIG. 1 is a schematic diagram showing a plan view of a polarization-dependent interferometric switch in accordance with one embodiment of the present invention.

FIG. 1 shows a polarization-dependent interferometric switch 10 capable of selectively directing at least one externally derived beam $B_i$ of substantially coherent, linearly polarized light, being represented in FIG. 1 by a cluster of light rays diverging from an input port 14. For the purpose of explanation of operation, it is assumed that the externally derived, linearly polarized light beam (e.g., $B_i$) comprises vertically or p-polarized light, i.e., light which has a polarization vector oriented along a Z axis that extends perpendicular to the plane of the figure (here the plane defined by the X and Y axes) and represented by the solid dots on the exemplary light rays shown therein. A collimating input lens 16, for example, can conveniently constitute means for dividing the externally derived light beam $B_i$ into a substantially identical constituent beam pair, e.g., b' and b".

An optical phase modulating device 20 is optically coupled to input lens 16 to receive the constituent beam pair b' and b". As used herein, "Optically coupled" refers to an arrangement in which one or more light beams are directed from one optical component to another in a manner which maintains the integrity of a signal carried by the light beam.

In the embodiment shown in FIG. 1, phase modulating device 20 has one pixel 22, situated to operate, for example, on constituent beam b'. By way of example and not of limitation, pixel 22 may comprise a nematic liquid crystal (LC) cell controllable by the voltage level of an electrical control signal (not shown) applied thereto to provide a voltage-dependent phase shift to constituent beam b'. In contrast, constituent beam b" passes through an inactive pixel 24 of phase modulating material which introduces a fixed phase shift to the constituent beam b" passing therethrough. Pixel 24, in this particular embodiment, may be simply replaced with a suitable glass film or the like. Thus, in the embodiment of FIG. 1, the phase differential between constituent beam pair b' and b" is solely selected in accordance with the voltage-dependent phase shift imparted by pixel 22 to constituent beam b'. For example, if the control signal applied to pixel 22 is selected to impart a phase shift to constituent beam b' which is equal to the fixed phase shift introduced by pixel 24, then the phase differential between constituent beam pair b' and b" is 0°. Alternatively, the control signal applied to pixel 22 can be selected to impart a predetermined phase shift to constituent beam b', which causes the phase differential between the constituent beam pair to become 180°; this mode of operation, i.e., a single pixel (e.g., 22) being operated to cause a selected shift in the phase differential (e.g., 180°) between the constituent beam pair is represented by the $\pi$ symbol therein.

Interferometric switch 10 further comprises an output unit 26 optically coupled to receive the constituent beam pair passing from the phase-modulating device 20. The output unit 26 may comprise a cube beam splitter 28 having first and second mutually orthogonal output axes (here the X and Y axes respectively) and a total internal reflection (TIR) prism 30 situated to direct incident light into cube beam splitter 28. It should be appreciated that the cube beam splitter 28 being a non-polarizing beam splitter, i.e., a beam splitter which does not alter the polarization of incident light, such as a polarizing beam splitter, can operate equally effectively on either polarized or unpolarized light. Therefore, as will be explained in further detail in the context of FIGS. 2A and 3A, the interferometric switch can be conveniently designed to be either polarization-dependent or independent depending on the characteristics of phase-modulating device 20.

Cube beam splitter 28 and prism 30 of the output unit 26 cooperate to combine along coincident collinear paths respective components of the received constituent beam pair. The collinear paths are situated such that respective combined components of the received constituent pair mutually interfere (either constructively or destructively) to form a respective output light beam ($b_{o1}$ or $b_{o2}$ shown in phantom lines) directed along at least a selected one of the first and second output axes, (here the X and Y axes respectively). In particular, when the constituent beam pair b' and b" has a selected phase differential of 0°, as selected via the phase-modulating device 20, the respective components thereof when combined along coincident collinear paths in output unit 26 interfere constructively along one of the output axes (e.g., the X axis) and destructively along the other output axis (e.g., the Y axis), thereby forming an output beam $bo_1$ along the constructively interfered, or X, output axis. Conversely, when the constituent beam pair has a phase differential of 180°, as selected via the phase-modulating device 20, the respective components thereof when combined in output unit 26 this time interfere constructively along the other output axis (e.g., the Y axis) thereby forming an output beam $bo_2$ along the Y output axis. In general, the light output relationship between the first and second output axes can be characterized in terms of a sinusoidal function whose argument is the phase differential between the constituent beam pair received by output unit 26. Thus, in the general case, interferometric switch 10 is not only capable of an on–off mode of operation, but is also capable of spatially multiplexing an output beam along both of the first and second output axes in accordance with the selected shift in the phase differential between the constituent beam pair imparted by the phase-modulating device 20. FIG. 1 further illustrates by way of example graded-index (GRIN) lenses 32 and 34 each disposed to optically couple a respective output light beam to an associated output port such as an optical fiber 36 and 38.

Figure 2A:
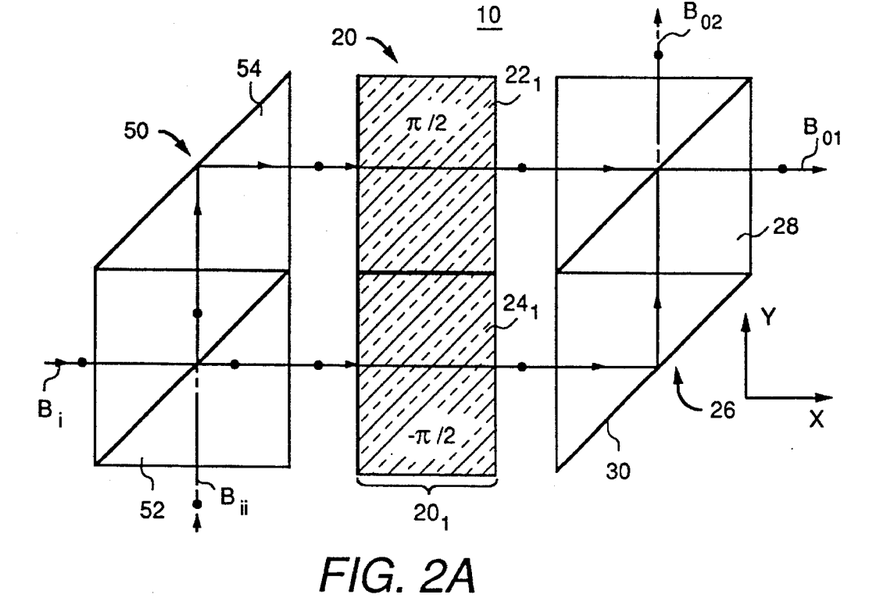
FIGS. 2A and 2B are schematic diagrams showing respective plan views of a polarization-dependent interferometric switch, in accordance with the present invention.

FIG. 2A illustrates an embodiment wherein an input unit 50 provides alternative convenient means for dividing an externally derived beam (e.g., $B_i$ or $B_{ii}$) of substantially coherent, linearly polarized light (hem vertically or p-polarized) received along either of first and second input axes (here the X and Y axes respectively). Input unit 50 comprises a respective cube beam splitter 52 and a TIR prism 54 which cooperate to form a substantially identical constituent beam pair b' and b" and which are optically coupled to phase-shifting device 20 so as to allow the constituent beam pair to directly pass therethrough. Further, those skilled in the art will appreciate that input unit 50 advantageously permits each constituent beam b' and b" to propagate substantially colinearly (e.g., along the X axis), and with substantially equal intensity as the corresponding externally derived light beam. Similar to the exemplary embodiment of FIG. 1, it is assumed that the externally derived light beam $B_i$ or $B_{ii}$ comprises substantially vertically or p-polarized light. Since the cube beam splitter 52 is a non-polarizing beam splitter, the assumed polarization state of each constituent beam b' and b" remains substantially identical to one another, i.e., each constituent beam maintains the same original polarization had by the externally derived light beam (here vertically or p-polarized).

As previously stated, interferometric switch 10 can be designed to operate either on polarized or unpolarized light depending on the characteristics of phase modulating device 20. The exemplary embodiments illustrated in FIGS. 2A and 2B, as well as FIG. 1, in particular incorporate a polarization-dependent phase-modulating device 20, as explained hereafter.

Briefly, the basis of a nematic LC pixel being able to provide a selected phase shift to light passing therethrough is its electrically controllable index of refraction. As is well understood by those skilled in the art, in an unexcited mode of operation, i.e., when the voltage of the control signal applied to the LC pixel has a zero value, parallel rub LC molecules can have a predetermined axial alignment which determines a reference optical axis, also generally referred as nematic molecular director. As used herein, reference optical axis refers to the axial alignment exhibited by the LC molecules in an unexcited mode of operation. In particular, if linearly polarized light passing therethrough has its polarization vector aligned substantially parallel with the reference optical axis of the LC, then such linearly polarized light can experience a selected phase shift determined by the index of refraction change induced by the control signal applied to the LC. In the exemplary embodiments of FIGS. 1, 2A and 2B, pixels illustrated with a right-tilt cross hatch specifically represent pixels whose LC molecules have a predetermined reference optical axis (here aligned parallel to the Z axis) substantially parallel to the assumed polarization vector orientation of constituent light beams respectively passing therethrough. Accordingly, the phase modulating device 20, as specifically described herein, is a polarization-dependent device capable of imparting a selected phase shift to linearly polarized light (here vertically or p-polarized light) having the assumed polarization vector orientation specifically indicated in FIGS. 1, 2A and 2B (here oriented parallel to the Z axis). Alternatively, if the externally derived light beam comprises horizontally or s-polarized light, i.e., light which has a polarization vector oriented parallel to the plane of the figure and along the Y axis, then the predetermined reference optical axis of the LC pixels in phase-modulating device 20 would require a like orientation, i.e., parallel to the plane of the figure and along the Y axis, for them to provide a selected phase shift to horizontally or s-polarized light.

It will be appreciated that phase-modulating device 20 shown in FIG. 2A comprises one pixel stage $20_1$ having one substantially coplanar associated pixel pair $22_1$ and $24_1$ which cooperates in response to respective, suitably biased control signals to provide a selected phase shift to each respective constituent beam respectively passing therethrough. For example, if a phase differential of 180° is desired between constituent pair b' and b", pixel $22_1$, can be operated to provide a +90° phase shift (as indicated by the π/2 designation) while pixel $24_1$, can be operated to provide a –90° phase shift (as indicated by the –π/2 designation) to constituent beams b' and b" respectively passing therethrough. This mode of operation is particularly useful to improve the switching speed of the interferometric switch. Analysis by S. T. Wu and C. S. Wu, in "Small Angle Relaxation of Highly Deformed Nematic Liquid Crystal," Applied Physics Letters, Vol 53, No. 19, 1988, pp 1794–1796, indicates that the on–off response time of a nematic LC based optical switch is directly proportional to the square of the refractive index change required to reach a selected 180° phase differential for full on–off operation. In particular, in the embodiment of FIG. 2A when operated as described above, only haft of the refractive index change is required from each pixel to provide a 180° overall phase differential between the constituent beam pair. Accordingly, the phase-modulating device illustrated in FIG. 2A with a cooperating associated pixel pair has an on–off response time four times faster than the single pixel phase-modulating device illustrated in FIG. 1.

Figure 2B:
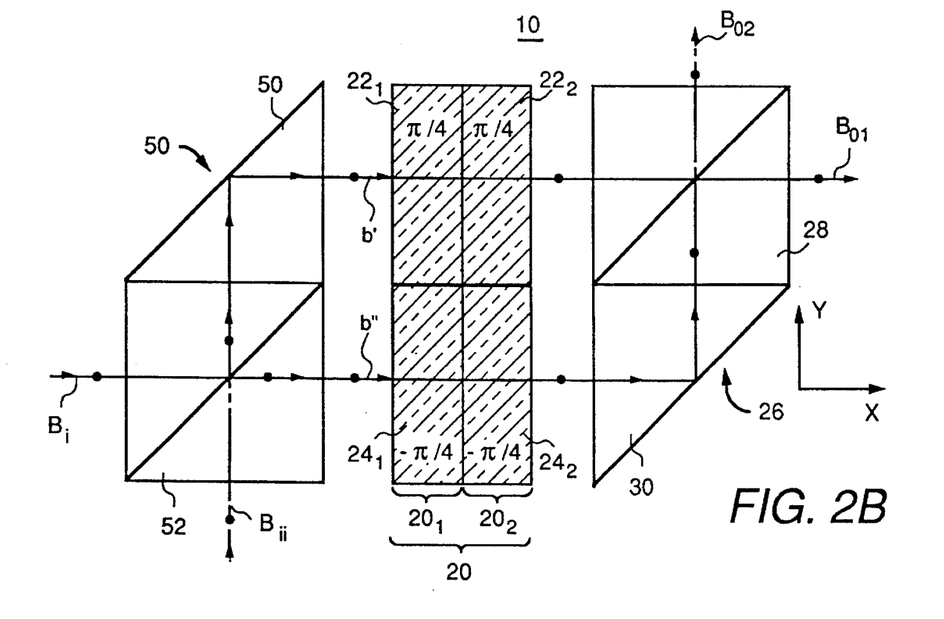

FIG. 2B illustrates a phase modulating device 20 with another pixel stage $20_2$ positioned in parallel relationship with the one pixel stage $20_1$ along a common axis, e.g., the X axis. Pixel stages $20_1$ and $20_2$ comprise cascading stages having mutually corresponding associated pixel pairs (e.g., associated pixel pair $22_1$ and $24_1$ corresponds to associated pixel pair $22_2$ and $24_2$). Each corresponding pixel pair of the cascading stages cooperates in response to predetermined control signals respectively applied thereto to respectively contribute a selected incremental phase shift to the constituent beam passing therethrough. For example, corresponding pixels $22_1$ and $22_2$ may each contribute an incremental phase shift of +45° (as indicated by the π/4 designation) while corresponding pixels $24_1$ and $24_2$ may each contribute an incremental phase shift of –45° (as indicated by the –π/4 designation). In particular, in the embodiment illustrated in FIG. 2B, only one quarter of the refractive index change is required from each pixel to reach the overall 180° phase differential between the constituent beam pair. Accordingly, the phase modulating device incorporating cascading pixel stages, as illustrated in FIG. 2B, has an on–off response 16 times faster than the phase modulating device illustrated in FIG. 1. Since on–off response times in the order of 1 msec or less are possible with the phase-modulating device of FIG. 1, the embodiments of FIGS. 2A and 2B, constitute an interferometric switch having an on–off response time in the order of less than about 250 and 63 μsec, respectively.

Figure 3A:
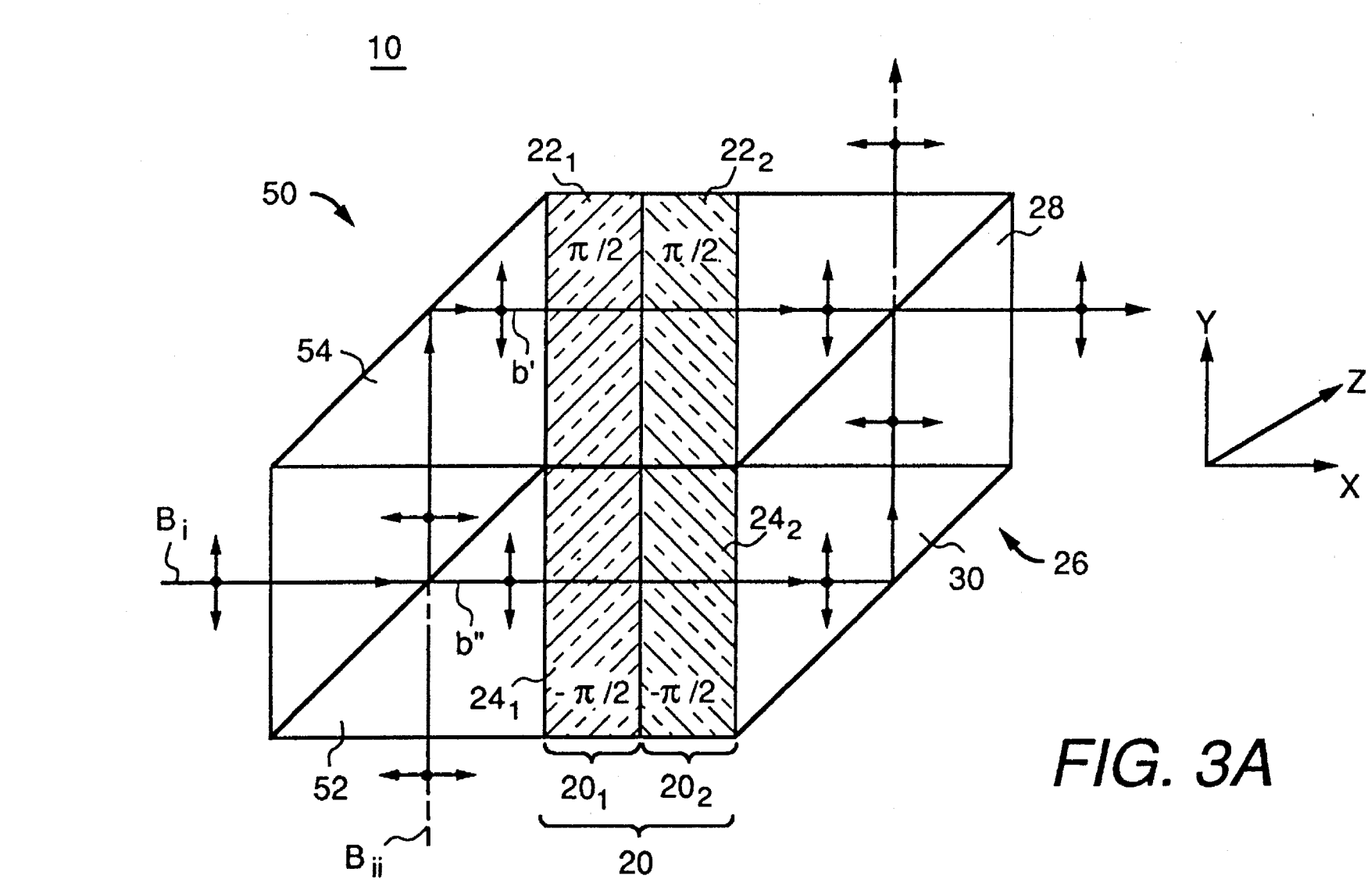
FIGS. 3A and 3B are schematic diagrams showing respective plan views of a polarization-independent interferometric switch, in accordance with the present invention.
Figure 3B:
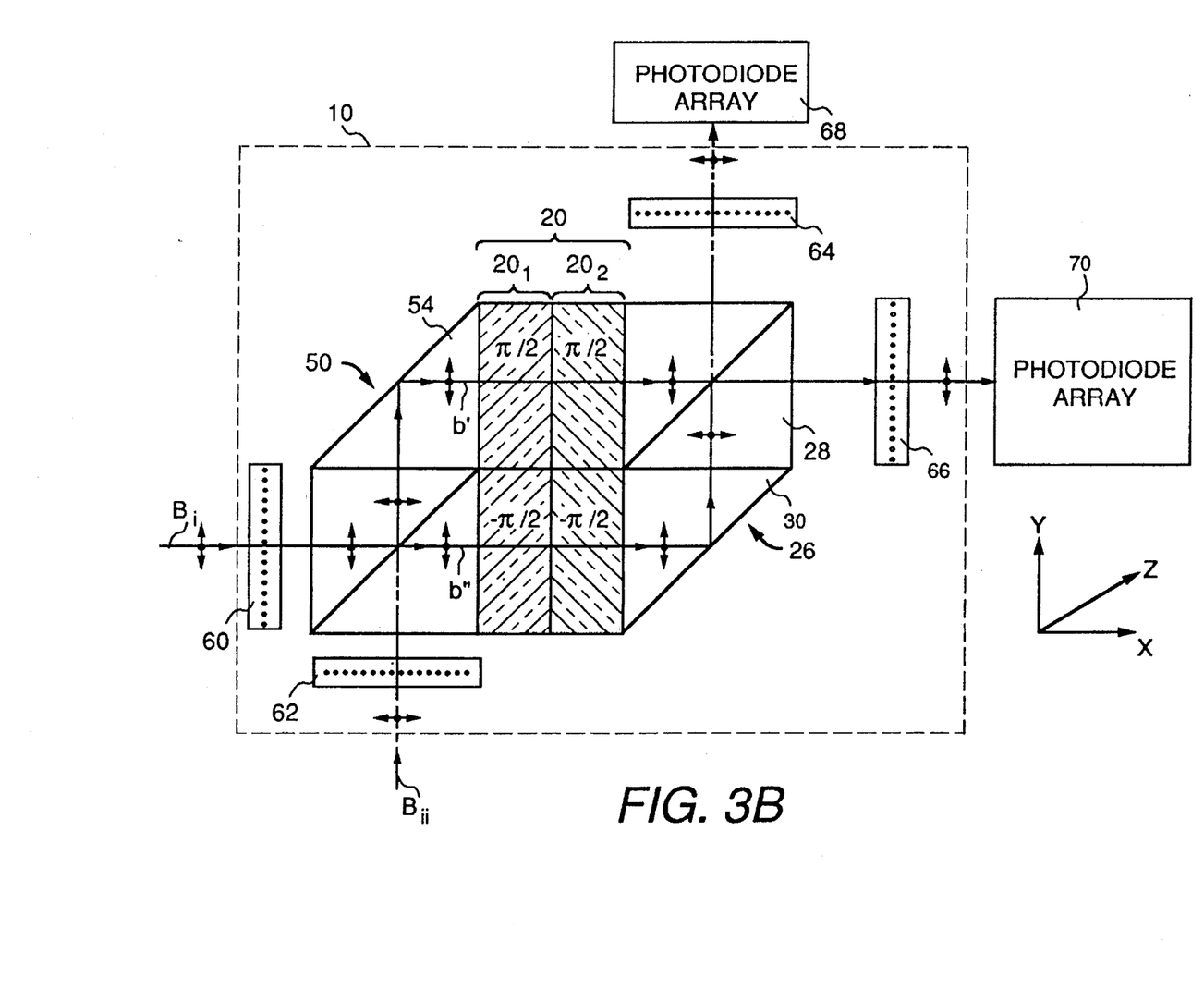

The exemplary embodiments illustrated in FIGS. 3A and 3B each represents a polarization-independent interferometric switch. The polarization independency of the switch directly results from the characteristics of the optical phase modulating device used therein. In FIG. 3A, cascading pixel stage $20_1$ includes an associated pixel pair $22_1$ and $24_1$ substantially identical to the nematic LC pixels described in the exemplary embodiment of FIGS. 2A and 2B, i.e., the light-tilt cross hatch represents nematic LC pixels whose predetermined reference optical axis is parallel to the Z axis. Meanwhile, the associated nematic LC pixel pair $22_2$ and $24_2$ of cascading pixel stage $20_2$, (illustrated with a left-tilt cross hatch) is a nematic LC pixel pair whose respective reference optical axis (here the Y axis) is mutually orthogonal to the predetermined reference optical axis (here the Z axis) of the pixel pair in cascading pixel stage $20_1$ as well as to their common axis (hem the X axis). Being that unpolarized light comprises both p and s-linearly polarized components (as represented, respectively, by the the solid dots and the twin headed arrows on the exemplary light beams shown in FIGS. 3A and 3B), cascading stages $20_1$ and $20_2$ respectively provide a selected phase shift to such polarized components in accordance with predetermined control signals respectively applied thereto. Accordingly, corresponding pixels $22_1$ and $22_2$ cooperate to provide a +90° phase shift to the unpolarized constituent light beam b' passing therethrough; in particular pixel $22_1$ imparts a +90° phase shift to the respective p-polarized component of the corresponding unpolarized constituent light beam passing therethrough, whereas pixel $22_2$ imparts a +90° phase shift to the respective s-polarized component of the same corresponding unpolarized constituent light beam b' passing threthrough. In a similar manner, corresponding pixels $24_1$ and $24_2$ can be respectively operated to cooperatively impart a −90° phase shift to the respective mutually orthogonal, linearly-polarized components of the corresponding unpolarized constituent light beam b" passing therethrough. The respective principle of operation of input unit 50 and output unit 26, is as previously described. Thus, when the interferometric switch 10 incorporates a polarization-independent modulating device, the interferometric switch can be advantageously used to spatially switch unpolarized light beams. FIG. 3A illustrates that to reduce noise effects the input unit 50 and the output unit 26 are preferably situated in close proximity to the phase modulating device so as to provide a compact interferometric switch in which there is minimal or no air gap.

FIG. 3B illustrates yet another embodiment wherein phase modulating device 20 comprises a spatial light modulator (SLM) which advantageously allows interferometric switch 10 to simultaneously and individually operate on additional externally derived light beams. For simplicity of explanation, prior embodiments have been described in terms of one input light beam; it should be understood, however, that a single interferometric switch with a SLM phase-modulating device can simultaneously handle many additional externally derived light beams, for example, more than about $10^4$ light beams per cm². By way of example, first and second arrays of input lenses 60 and 62, respectively, can be optically coupled to the input unit 50 to focus thereinto externally derived light beams so as to form a plurality of constituent beam pairs. Alternatively, instead of the single input lens lens 16 illustrated in the embodiment of FIG. 1, an array of input lenses (not shown) may be used as beam-dividing means to form the plurality of constituent beam pairs, as illustrated in FIG. 1 in the context of a single input beam. A SLM phase modulating device typically includes an array of pixels, for instance a two-dimensional pixel array disposed in the Y–Z plane, which can be patterned so that predetermined pixels of such pixel array individually receive respective ones of the plurality of constituent beam pairs from input unit 50 so as to provide a selected phase differential between each respective constituent beam pair passing therethrough. It should also be appreciated that the SLM can be made ;either polarization dependent or independent, as described in the context of FIGS. 2A and 3A, respectively. FIG. 3B further illustrates first and second output arrays of collimating lenses 64 and 66, respectively, which can focus output light beams emerging from output unit 26 into associated first and second photodiode arrays, respectively. The photodiode arrays can advantageously convert received output light beams into corresponding electrical signals (not shown) which can be conveniently used for remote control applications of numerous industrial components such as motors or illumination systems.

While only certain features of the invention have been illustrated and described herein, many modification and changes will occur to those skilled in the art. It is, therefore, to be understood that the appended claims are intended to cover all such modifications and changes as fall within the spirit of the invention.

What is claimed is:

1. An interferometric spatial switch for selectively directing at least one externally derived beam of substantially coherent light, said switch comprising:

means for dividing said externally derived light beam into a substantially identical constituent beam pair;

an optical phase modulating device optically coupled to said beam-dividing means to receive said constituent beam pair, said phase modulating device having liquid crystal pixel means situated to shift phase of at least one constituent beam of said constituent beam pair, said pixel means being electrically controllable sufficiently fast for selectively shifting the phase differential between said constituent beam pair, said pixel means comprising at least one stage having at least one associated pair of substantially coplanar liquid crystal (LC) pixels each cooperating in response to predetermined control signals respectively applied thereto to respectively contribute a selected phase shift to each respective constituent beam of said constituent beam pair respectively passing through said associated pixel pair;

whereby each pixel of said one pixel stage respectively contributes to the overall selected phase differential between said constituent beam pair passing therethrough;

said pixel means further comprising another pixel stage being positioned in parallel relationship with said one pixel stage along a common axis, each of said pixel stages comprising cascading pixel stages having mutually corresponding associated pixel pairs, each respective corresponding pixel pair in said cascading pixel stages cooperating in response to predetermined control signals respectively applied thereto to respectively impart a selected incremental phase shift to each respective constituent beam of said constituent beam pair passing through said cascading pixel stages;

whereby each corresponding pixel of said cascading stages respectively contributes to the overall selected phase differential between said constituent beam pair passing therethrough; and an output unit optically coupled to receive said constituent beam pair passing from said phase-modulating device, said output unit having polarization-independent means for combining along coincident collinear paths respective components of said received constituent beam pair, said collinear paths being situated such that said combined components of said constituent beam pair mutually interfere to form a respective output light beam directed along at least a selected one of first and second output axes, according to the phase differential imparted by said phase-modulating device.

2. The switch according to claim 1 wherein said combining means of said output unit comprises a cube beam splitter having substantially orthogonal first and second output axes, and a prism situated to deflect incident light into said cube beam splitter.

3. The switch according to claim 2 wherein said output unit is operatively capable of spatially multiplexing said output beam along both of said first and second output axes in accordance with the phase differential between said received constituent beam pair.

4. The switch according to claim 2 wherein said beam dividing means comprises an input collimating lens.

5. The switch according to claim 2 wherein said beam dividing means comprises an input unit optically coupled to pass at least said constituent beam pair to said phase-modulating device, said input unit comprising a cube beam splitter having mutually orthogonal first and second input axes, and a prism situated to deflect incident light into said phase modulating device.

6. The switch according to claim 5 wherein said associated LC pixel pairs of said one pixel stage has a predetermined reference optical axis, said pixel pair being adapted to phase shift linearly polarized light having a predetermined polarization orientation substantially parallel to said reference optical axis.

7. The switch according to claim 6 wherein said pixel means in said one pixel stage comprises a polarization dependent SLM.

8. The switch according to claim 5 wherein said LC pixel pair of said another pixel stage has a respective reference optical axis aligned substantially parallel with respect to said predetermined reference optical axis of said one stage.

9. The switch according to claim 8 wherein said pixel means in said cascading pixel stages is adapted to phase shift linearly polarized light having a predetermined polarization orientation substantially parallel to each of said reference optical axes.

10. The switch according to claim 9 wherein said pixel means in said cascading pixel stages comprises a polarization dependent SLM.

11. The switch according to claim 5 wherein said associated LC pixel pair of said another pixel stage has a respective reference optical axis being aligned mutually orthogonal with respect to said predetermined reference optical axis of said one stage and said common axis.

12. The switch according to claim 11 wherein said pixel means in said cascading stages is adapted to phase shift unpolarized light.

13. The switch according to claim 12 wherein said pixel means in said cascading stages comprises a polarization independent SLM.

14. The switch according to claim 5 further including first and second input arrays of collimating lenses optically coupled to said input unit to focus thereinto externally derived light bees passing along said first and second input axes respectively, said input unit thereby forming a plurality of constituent beam pairs.

15. The switch according to claim 14 wherein the pixel means of said phase modulating device comprises a spatial light modulator (SLM), said SLM comprising an array of individually controllable liquid crystal pixels patterned to receive respective ones of said plurality of constituent beam pairs received from said input BS unit;

whereby predetermined LC pixels of said pixel array can individually and simultaneously provide a selected phase differential between each respective one of said plurality of constituent beam pairs.

16. The switch according to claim 15 wherein said output unit is operatively capable of spatially multiplexing respective output beams along both of said first and second output axes, in accordance with the phase differential between respective ones of said received plurality of constituent beam pairs.

17. The switch according to claim 2 wherein said beam dividing means comprises an array of input collimating lenses situated to receive said externally derived light beam and additional externally derived light beams, the lenses of said lens array cooperating to form a plurality of constituent beam pairs.

18. The switch according to claim 17 wherein the pixel means of said phase modulating device comprises a spatial light modulator (SLM), said SLM having an array of individually controllable LC pixels patterned to receive respective ones of said plurality of constituent beam pairs from said input lens array;

whereby predetermined LC pixels of said pixel array can individually and simultaneously provide a selected phase differential between each respective one of said plurality of constituent beam pairs.

19. The switch according to claim 18 further including first and second output arrays of collimating lenses optically coupled to said output unit to receive and focus output light beams emerging therefrom along said first and second output axes respectively.

20. The switch according to claim 19 further including first and second photodiode arrays optically coupled to said first and second output arrays of collimating lenses, respectively, to convert received output light beams into corresponding electrical signals.

21. The switch according to claim 18 wherein said output unit is operatively capable of spatially multiplexing respective output beams along both of said first and second output axes, in accordance with the phase differential between respective ones of said received plurality of constituent beam pairs.

22. The switch according to claim 21 further including first and second output arrays of collimating lenses optically coupled to said output unit to receive and focus multiplexed output light beams emerging therefrom along said first and second output axes respectively.

23. The switch according to claim 22 further including first and second photodiode arrays optically coupled to said first and second output arrays of collimating lenses, respectively, to convert said multiplexed output light beams into corresponding electrical signals.

24. An interferometric process for spatially switching at least one externally derived beam of substantially coherent light comprising the steps of:

dividing said externally derived light beam into a substantially identical constituent beam pair;

providing liquid crystal pixel means to phase modulate at least one constituent beam of said constituent beam pair, said pixel means comprising at least one stage having at least one associated pair of substantially coplanar liquid crystal (LC) pixels each cooperating in response to predetermined control signals respectively applied thereto to respectively contribute a selected phase shift to each respective constituent beam of said constituent beam pair respectively passing through said associated pixel pair;

whereby each pixel of said one pixel stage respectively contributes to the overall selected phase differential between said constituent beam pair passing therethrough;

said pixel means further comprising another pixel stage being positioned in parallel relationship with said one pixel stage along a common axis, each of said pixel stages comprising cascading pixel stages having mutually corresponding associated pixel pairs, each respective corresponding pixel pair in said cascading pixel stages cooperating in response to predetermined control signals respectively applied thereto to respectively impart a selected incremental phase shift to each respective constituent beam of said constituent beam pair passing through said cascading pixel stages;

whereby each corresponding pixel of said cascading stages respectively contributes to the overall selected phase differential between said constituent beam pair passing therethrough;

controlling the pixel means sufficiently fast for selectively shifting the phase differential between said constituent beam pair; and combining along coincident collinear paths respective components of said constituent beam pair, said collinear paths being situated such that said combined components of said constituent beam pair mutually interfere to form a respective output beam directed along at least a selected one of first and second output axes according to the phase differential between said constituent beam pair.

25. The process according to claim 24 wherein said output beam is spatially multiplexed along both of said first and second output axes according to the phase differential between said constituent beam pair.

26. The process according to claim 24 wherein the step of phase-modulating comprises incrementally phase-shifting said constituent beam pair.

27. The process according to claim 24 wherein the step of dividing further comprises dividing additional externally derived light beams passing along either of first and second input axes so as to form a plurality of respective constituent beam pairs.

28. The process according to claim 27 wherein the step of phase-modulating further comprises phase-shifting respective ones of said plurality of constituent beam pairs such that each respective one of said plurality of constituent beam pairs has an individual predetermined phase differential shift therebetween.

29. The process according to claim 28 wherein the step of phase-modulating comprises incrementally phase-shifting respective ones of said plurality of constituent beam pairs.

30. The process according to claim 24 wherein the step of phase-modulating is polarization-dependent.

31. The process according to claim 24 wherein the step of phase-modulating is polarization-independent.

32. An interferometric spatial switch for selectively directing a plurality of externally derived beams of substantially coherent light, said switch comprising:

means for dividing said plurality of externally derived light beams into a corresponding plurality of substantially identical constituent beam pairs, said beam dividing means comprising an array of input collimating lenses situated to receive said plurality of externally derived light beams, the lenses of said lens array cooperating to form said plurality of constituent beam pairs;

an optical phase modulating device optically coupled to said beam-dividing means to receive said plurality of constituent beam pairs, said phase modulating device having liquid crystal (LC) pixel means situated to shift phase of at least one constituent beam of respective ones of said plurality of constituent beam pairs, said pixel means being electrically controllable for selectively shifting the phase differential between respective ones of said constituent beam pairs, and wherein said pixel means comprises a spatial light modulator (SLM) having an array of individually controllable LC pixels patterned to receive respective ones of said plurality of constituent beam pairs from said input lens array;

whereby predetermined LC pixels of said pixel array can individually and simultaneously provide a selected phase differential between each respective one of said plurality of constituent beam pairs; and an output unit optically coupled to receive constituent beam pairs passing from said phase-modulating device, said output unit having polarization-independent means for combining along coincident collinear paths respective components of said received constituent beam pairs, said collinear paths being situated such that said combined components of respective ones of said constituent beam pairs mutually interfere to form a plurality of output light beams directed along at least a selected one of first and second output axes, according to the respective phase differential imparted by said phase-modulating device.

* * * * *